(12) United States Patent
Streyckmans

(10) Patent No.: US 6,273,113 B1
(45) Date of Patent: Aug. 14, 2001

(54) VEHICLE FLOOD PROTECTION SYSTEM

(75) Inventor: Walter E. Streyckmans, Hudson, FL (US)

(73) Assignee: Aqua Vault, Inc., New Port Richey, FL (US)

( * ) Notice: Subject to any disclaimer, the term of this patent is extended or adjusted under 35 U.S.C. 154(b) by 0 days.

(21) Appl. No.: 09/430,540

(22) Filed: Oct. 29, 1999

(51) Int. Cl.$^7$ ................................................ E04H 15/06
(52) U.S. Cl. .............................. 135/88.13; 52/4; 52/23; 52/DIG. 12
(58) Field of Search ............................ 135/88.05, 88.13; 52/3, 4, 23, DIG. 12, DIG. 14; 150/154, 166, 167; 296/130, 136; 206/335

(56) References Cited

U.S. PATENT DOCUMENTS

| | | | |
|---|---|---|---|
| 982,046 | * | 1/1911 | Flemming .......................... 206/335 |
| 1,691,379 | | 11/1928 | Christ, Jr. . |
| 3,474,803 | | 10/1969 | Davis . |
| 3,772,838 | * | 11/1973 | Virnig ................................ 52/23 X |
| 3,783,766 | * | 1/1974 | Boucher ............................. 52/2 X |
| 3,927,494 | * | 12/1975 | Struben ................................ 52/23 |
| 4,261,401 | * | 4/1981 | Hickey .............................. 206/335 |
| 4,315,535 | | 2/1982 | Battle . |
| 4,773,456 | | 9/1988 | Rodgers . |
| 4,783,177 | * | 11/1988 | Reed .............................. 206/335 X |
| 4,930,832 | | 6/1990 | Shelton . |
| 5,190,089 | | 3/1993 | Jackson . |
| 5,445,200 | * | 8/1995 | Clestino et al. .............. 206/335 X |
| 5,921,389 | * | 7/1999 | Zoffer ................................ 206/335 |
| 6,059,105 | * | 5/2000 | Allain et al. ....................... 206/335 |

* cited by examiner

Primary Examiner—Peter M. Cuomo
Assistant Examiner—Hanh V. Tran
(74) Attorney, Agent, or Firm—Dennis G. LaPointe; Mason & Associates, PA

(57) ABSTRACT

A vehicle flood protection system includes a vehicle housing to which a cover is hinged. The peripheries of the cover and housing each include locking mechanisms for creating a water tight seal. The cover further includes a spring biased valve for use in expelling air from the enclosure. The entire system is adapted to be anchored to the ground by way of a pair of straps. Through the use of the system a vehicle can be protected from the elevated water levels associated with floods.

5 Claims, 4 Drawing Sheets

VEHICLE FLOOD PROTECTION SYSTEM

BACKGROUND OF THE INVENTION

1. Field of the Invention

The present invention relates to a flood protection system, and more particularly relates to a system for anchoring and enclosing a vehicle against elevated water conditions.

2. Description of Related Art

The use of vehicle flood protection containers is known in the art. Such containers typically include a cover to protect an automobile from water damage.

An example of this is U.S. Pat. No. 4,315,535 to Battle which discloses a flood protecting apparatus for vehicles. The apparatus includes an upper orifice and cord housed within a continuous channel for constricting the orifice.

Similarly, U.S. Pat. No. 4,773,456 to Rodgers discloses a motor vehicle flood protecting apparatus. The apparatus includes an elongated vent tube.

Other vehicle enclosures are known in the art. These include U.S. Pat. No. 3,474,803 to Davis and U.S. Pat. No. 1,691,379 to Christ, Jr.

U.S. Pat. No. 5,190,089 to Jackson discloses a protective collapsible bag assembly for appliance items.

Lastly, U.S. Pat. No. 4,930,832 to Shelton discloses a puncture and tear resistant armored convertible top for an automobile.

None of these covers, however, is specifically adapted to enclose a vehicle as it is completely submersed in flooding waters. Consequently, none of the covers described hereinabove includes anchoring means for preventing an enclosed vehicle from floating.

Therefore, it can be appreciated that there exists a continuing need for new and improved vehicle housings which can be used for anchoring an enclosed vehicle to the ground. In this regard, the present invention substantially fulfills this need.

SUMMARY OF THE INVENTION

The general purpose of the present invention is to provide a vehicle enclosure system which anchors a vehicle to the ground, thereby preventing it from floating away.

To attain this, the present invention essentially comprises a vehicle flood protection system comprising a vehicle housing having a lower surface and side walls integral thereto. The housing defines forward and rearward portions as well as a central portion. Each of the side walls has an upper peripheral edge with a locking element formed thereon. A housing cover is included with a rearward edge integral with one of the side walls of the housing and a peripheral edge with a locking element integral thereto. A spring biased vent is centrally formed within the housing cover. The vent has a first orientation forming a fluid tight seal with the cover and a second orientation wherein air is permitted egress from an interior of the housing.

It is therefore an object of the present invention to provide a fluid tight vehicle enclosure which is formed from a lightweight puncture proof material.

It is another object of the present invention to provide a vehicle enclosure which allows for the egress of air while at the same time preventing the inflow of water.

It is a further object of the present invention to provide a vehicle enclosure which is specifically designed to be anchored to the ground.

An even further object of the present invention is to provide a vehicle enclosure whereby a vehicle can be retained and protected underwater.

Even still another object of the present invention is to create a method for protecting a vehicle in underwater conditions.

Lastly it is an object of the present invention to provide an emergency flood protection and anchoring system. The system includes a vehicle housing defining a lower surface and side walls integral thereto. The housing further defines lower forward and rearward portions as well as a raised central portion. Each of the side walls have an upper peripheral edge with a resilient male zip lock element formed thereon. The housing is completely formed from a lightweight and flexible Kevlar™ material. A housing cover is further included and has a rearward edge integral with one of the side walls of the housing and a peripheral edge with a female zip-lock element integral thereto. A spring biased vent is centrally formed within the housing cover. The vent has a first orientation forming a fluid tight seal with the cover and a second orientation wherein air is permitted egress from an interior of the housing. A vehicle to be protected, having a forward portion, a rearward portion and an intermediate portion therebetween, is positioned within the housing. Thereafter, the cover is secured to the peripheral edge of the housing by way of the male and female zip lock elements. Forward and rearward anchoring straps are included with each of the straps having an intermediate non elastic extent and outer elastic extents. A levered adjustment mechanism is secured along the intermediate extent for use in adjusting the length of each anchoring strap. A pair of cork-screw anchors are releasably secured to outer ends of each anchoring strap for securing the strap to the ground. The forward anchoring strap is positioned over the forward portion of the vehicle. The rearward anchoring strap is positioned over the rearward portion of the vehicle.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DETAILED DESCRIPTION OF THE INVENTION

Figure 1:
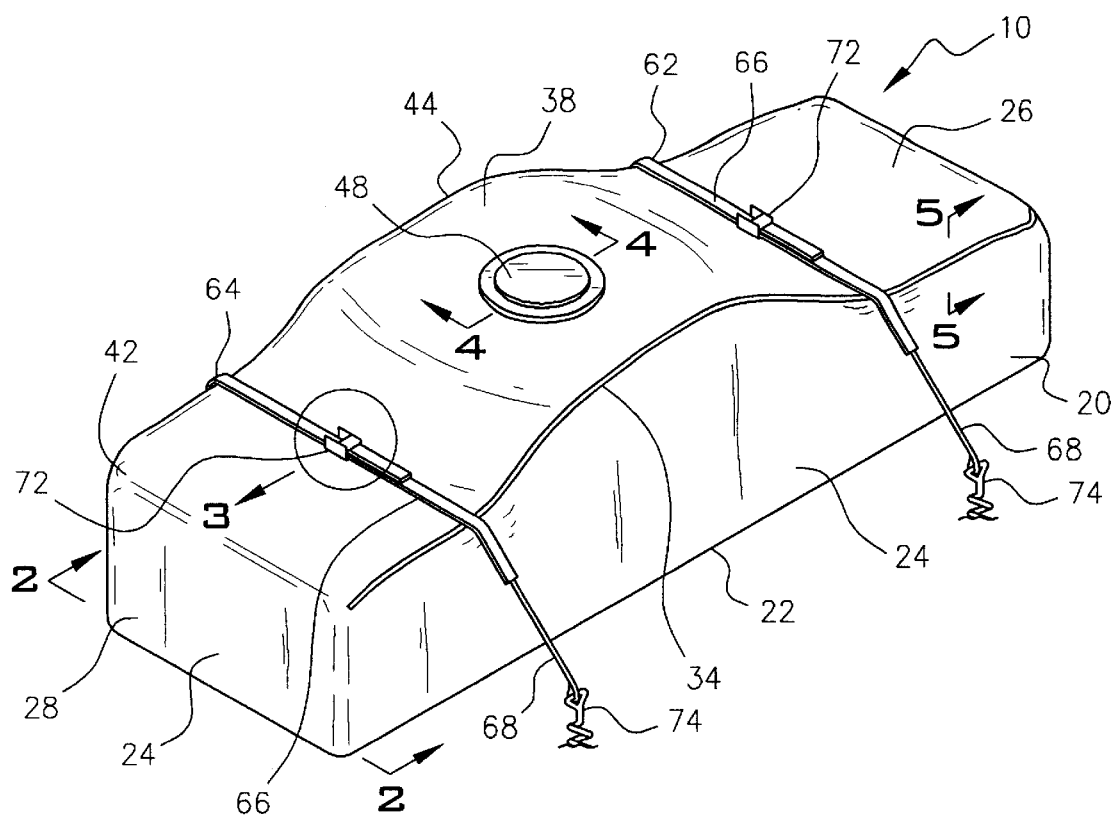
FIG. 1 is a perspective view of the vehicle protection system of the present invention.

The present invention relates to a flood protection system for a vehicle. The system includes a vehicle housing to which a cover is hinged. The peripheries of the cover and housing each include locking mechanisms for creating a water tight seal. The cover further includes a spring biased valve for use in expelling air from the enclosure. The entire system is adapted to be anchored to the ground by way of straps. Through the use of the system a vehicle can be protected from the elevated water levels associated with floods. The remainder of the detailed description will set forth the various system components in more detail.

Vehicle Protection System

The primary component of the emergency flood protection and anchoring system 10 is the vehicle housing 20. Such housing 20 is most clearly depicted in FIGS. 1 and 6. The housing 20 is defined by a lower surface 22 and integral side walls 24. The housing 20 is further defined by lower forward 26 and rearward portions 28 as well as a raised central portion 32. Each of these portions is created by a curved upper peripheral edge 34. The overall housing geometry is adapted to accommodate standard sized vehicles. Other housing shapes are within the scope of the present invention and could be employed to house vehicles of varying shapes and sizes.

Each of the side walls 24 include a resilient male zip lock element 36 formed upon the upper peripheral edge 34. The function of the zip-lock element will be described in greater detail hereinafter. In the preferred embodiment, the housing 20 is completely formed from a lightweight, flexible and puncture proof material. A lightweight and flexible Kevlar™ material has been found to suit this need. Another acceptable housing material is Visqueen™. Other suitable substantially puncture proof materials are known in the art that provides characteristics and properties similar to the above mentioned materials.

Figure 4:
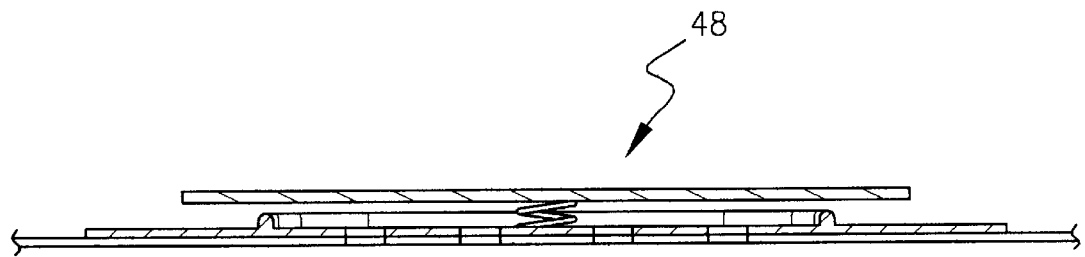
FIG. 4 is a sectional view taken along line 4—4 of FIG.
Figure 5:
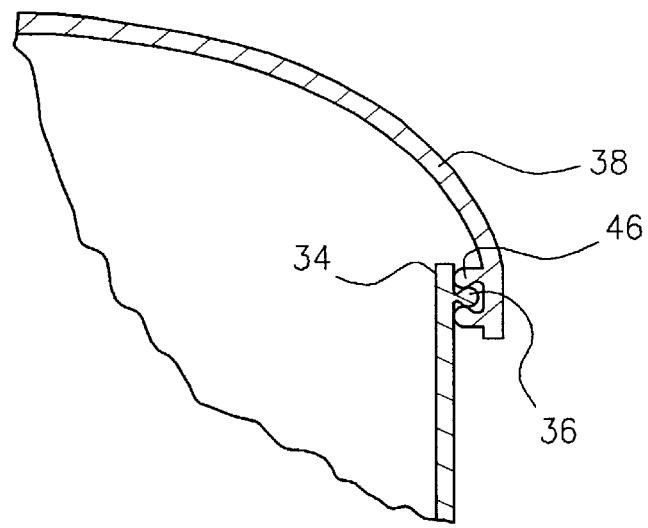
FIG. 5 is a sectional view taken along line 5—5 of 10 FIG. 1.
Figure 6:
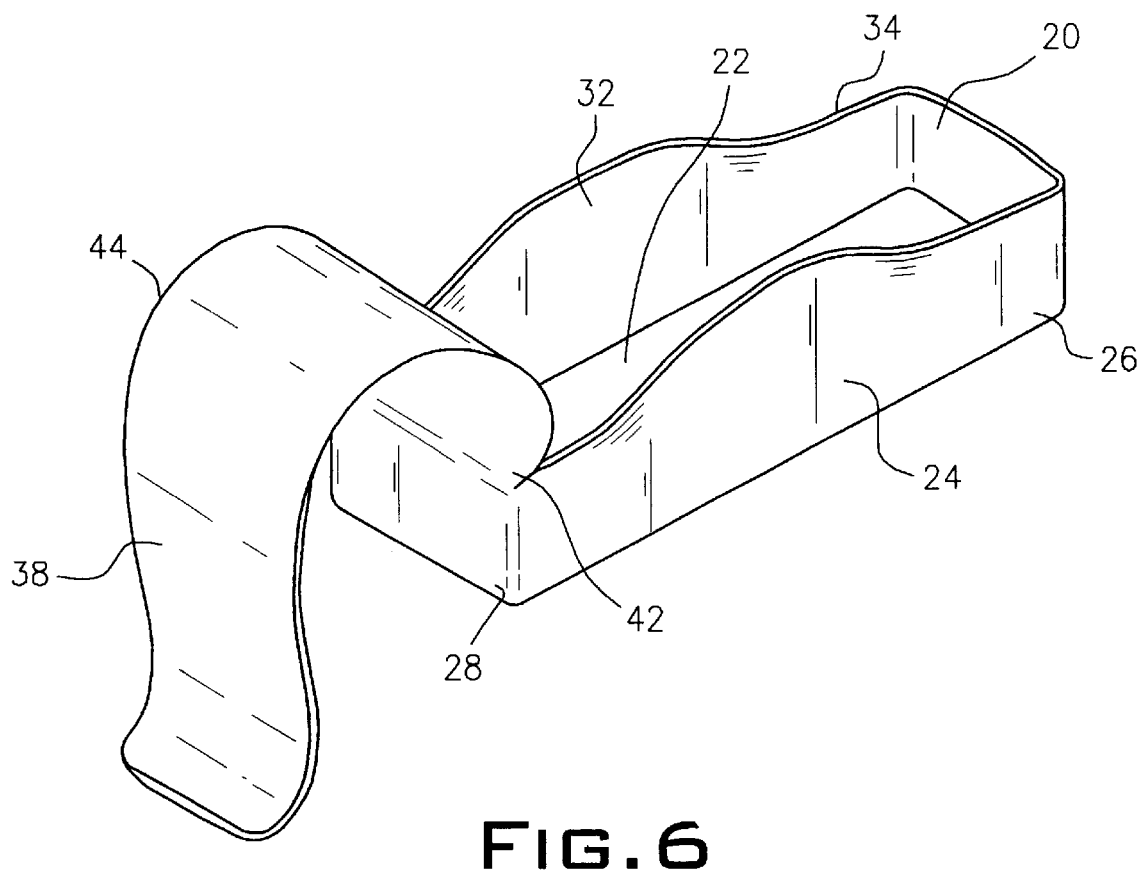
FIG. 6 is a perspective view of the vehicle enclosure with the cover removed.
Figure 7:
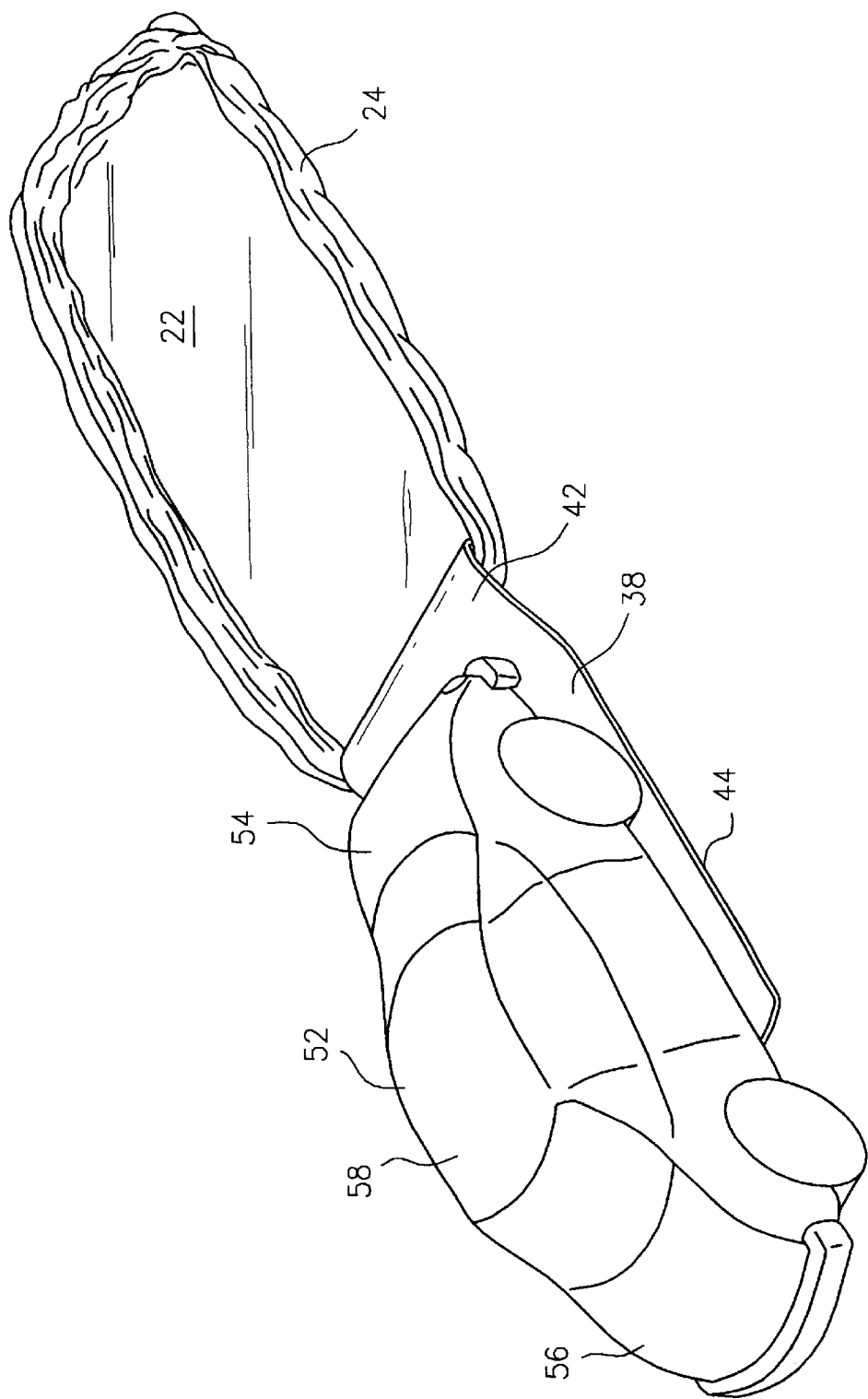
FIG. 7 is a perspective view of the vehicle being driven into the enclosure.

With reference now to FIGS. 6 and 7 the housing cover 38 is depicted. The cover 38 is defined by a rearward edge 42 which is integral with one of the side walls 24 of the housing 20. The cover further includes a peripheral edge 44 with a female zip-lock element 46 integral thereto. The female zip-lock element 46 is adapted to form a water tight seal with the male zip-lock element 36 of the housing 20. Although zip lock enclosures have been described, other fasteners which create a water impervious seal could be employed. Turning now to FIGS. 1 and 4, the spring biased vent 48 of the system will be described. This vent 48 is centrally formed within the housing cover 38. The vent 48 has a first orientation forming a fluid tight seal with the cover 38 and a second orientation wherein air is permitted egress from an interior of the housing 20. FIG. 4 illustrates the vent 48 in the second orientation, wherein the spring is under tension and air is evacuated from the interior of the sealed housing 20. Once a sufficient amount of air is evacuated, the force of the spring takes over and the vent is seated against the housing cover 38. The spring constant is selected such that air is only expelled after a predetermined air pressure is achieved within the sealed housing 20.

FIG. 7 illustrates a vehicle 52 to be protected being driven into the enclosure. Typically, such a vehicle 52 has a forward portion 54, a rearward portion 56 and an intermediate portion 58 therebetween. After the vehicle 52 is centrally positioned within the housing 20, the side walls 24 are raised up over the top of the vehicle 52. Thereafter, the cover 38 is secured to the peripheral edge 34 of the housing 20 by way of the male and female zip lock elements, 36 and 46 respectively. This creates a water tight and fluid impervious seal.

Figure 3:
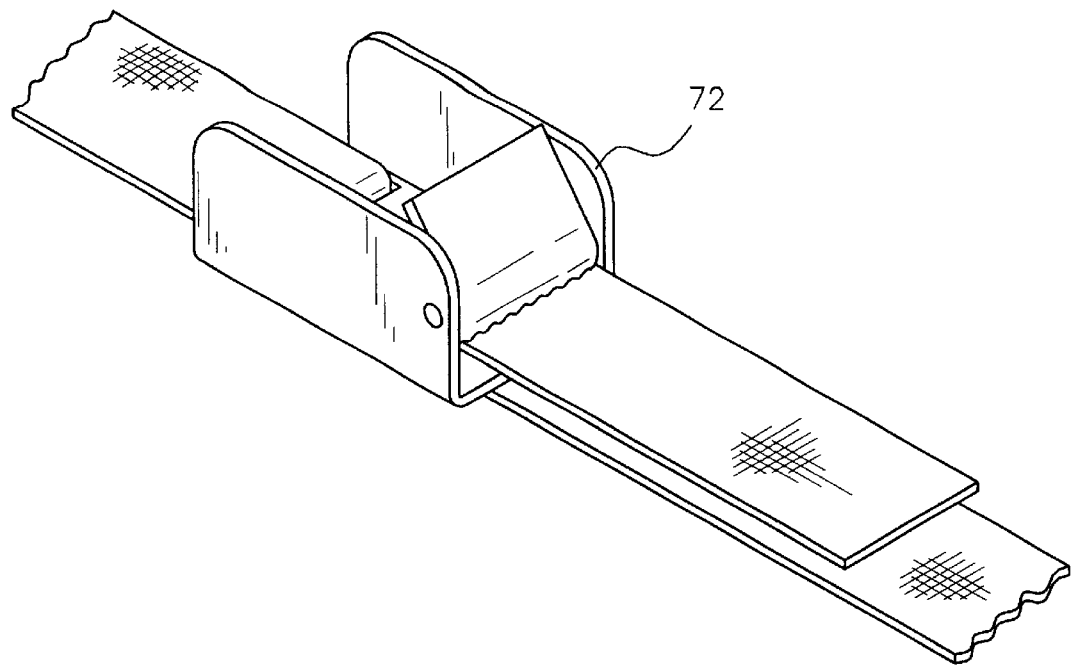
FIG. 3 is a detailed view, taken from FIG. 1, of the levered adjustment mechanism.

FIGS. 1 and 3 illustrate the anchoring straps which are employed in securing an enclosed vehicle to the ground. Specifically, forward and rearward anchoring straps (62 and 64) are included. Each of the straps includes an intermediate non elastic extent 66 and outer elastic extents 68. The outer elastic extents 68 afford a degree of flexibility to each straps, in that each elastic extent or cord provides a means for allowing the vehicle to float with rising water levels. FIG. 3 illustrates that one half of each strap comprises a folded over free end. This construction enables each strap to be adjusted to any one of a variety of lengths. A levered adjustment mechanism 72 is secured along the intermediate length of each of the straps. Specifically, one half of the mechanism is secured to the first portion of the strap. The second half of the mechanism is slidably secured to the folded over portion of the strap. The lever mechanism is employed in locking the strap to a desired adjusted length.

Figure 2:
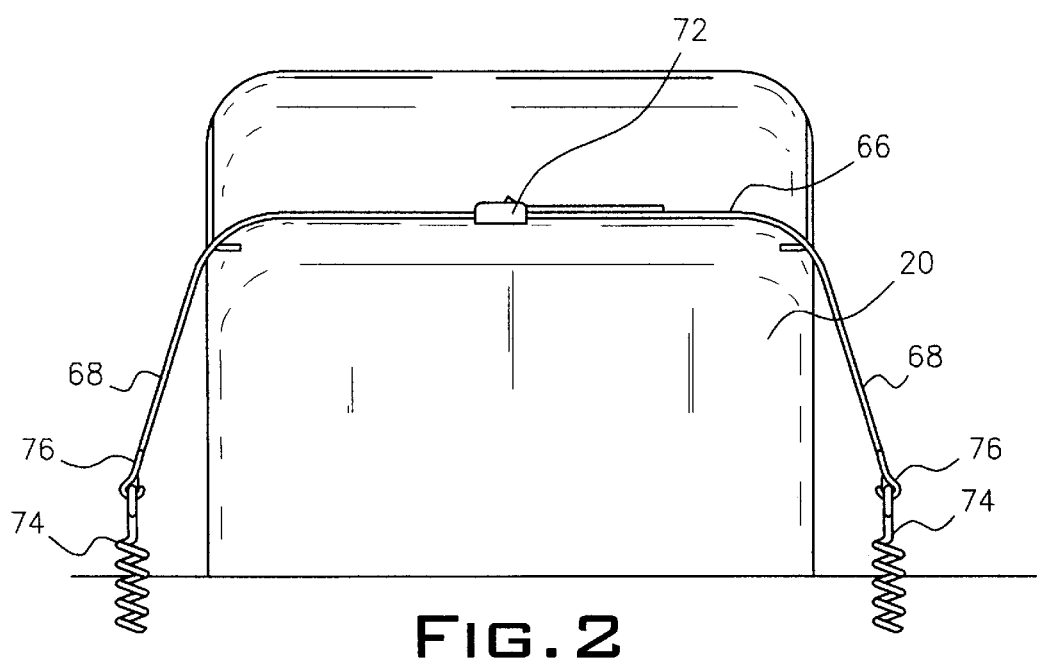
FIG. 2 is a view taken along line 2—2 of FIG. 1.

With reference to FIG. 2, one pair of cork-screw anchors 74, which are releasably secured to outer ends of each anchoring strap, are depicted. These anchors 74 are releasably secured to the ends of an associated strap by way of hooks 76 with spring biased closures. The anchors 74 include a cork-screw type body to enable the anchor be to be threaded into, and out of, the ground. Through the use of the anchors 74, the forward anchoring strap 62 is positioned and secured over the forward portion 54 of the enclosed vehicle 52; likewise, the rearward anchoring 64 strap is positioned and secured over the rearward portion 56 of the enclosed vehicle 52. The cork-screw type anchors 74 described are specifically adapted for use within soil. However, other anchoring systems can be employed. For example, permanent anchors can be set within a user's driveway.

Vehicle Protection Method

The present invention also relates to a method of protecting a vehicle from elevated water levels. This method includes the following steps.

First, a vehicle housing is provided. As previously described, the housing ideally has a lower surface and non rigid side walls integral thereto. Each of the side walls additionally includes an upper peripheral edge with a locking element formed thereon. A housing cover is included which has a rearward edge integral with one of the side walls of the housing and a peripheral edge with a locking element integral thereto. A spring biased vent is centrally formed within the housing cover.

Next, the side walls are gathered about the lower surface such that the peripheral edges are approximately level with the lower surface of the housing.

Thereafter, the vehicle to be protected is driven over the gathered side walls and onto the lower surface of the housing.

In the next step, the gathered side walls are raised above the top of the vehicle. Thereafter, the locking element of the side walls are secured to the locking element of the cover.

Next, forward and rearward anchoring straps are provided. Each of these straps has a levered adjustment mechanism secured along an intermediate extent.

One end of the forward and rearward anchoring straps are secured into the ground by way of anchoring screws.

In the next step, the forward strap is positioned over a forward portion of the vehicle. Similarly, the rearward strap is positioned over the rearward portion of the vehicle.

Thereafter, the opposite ends of the forward and rearward anchoring straps are secured into the ground by way of anchoring screws.

Finally, the forward and rearward straps are tightened by way of the levered adjustment mechanisms.

Once so secured, the vehicle is protected from rising water levels. Furthermore, any air bubbles within the enclosure can be evacuated by way of the valve. Further still, the enclosed vehicle is prohibited from floating away by virtue of the anchoring straps.

This detailed description has been provided only for illustrative purposes. It is recognized that other embodiments maybe articulated without departing from the objects and scope of the present invention. Any such modifications and variations are meant to be within the scope of the invention as contained within the following claims.

What is claimed as being new and desired to be protected by Letters Patent of the United States is as follows:

1. A vehicle flood protection system comprising:
   a vehicle housing having a lower surface and side walls integral thereto, the housing defining forward and rearward portions as well as a central portion, each of the side walls having an upper peripheral edge with a locking element formed on three of the side walls of the vehicle housing; and
   a housing cover having an edge integral with one of the side walls of the housing and a peripheral edge with a locking element formed thereon for engagement with the corresponding locking element formed on the three side walls of the vehicle housing, a spring biased vent centrally formed within the housing cover, the vent having a first orientation forming a fluid tight seal with the cover and a second orientation wherein air is permitted egress from an interior of the housing.

2. The vehicle protection system according to claim 1, further comprising:
   forward and rearward anchoring straps, a pair of anchors releasably secured to outer ends of each anchoring strap for securing the strap to the ground, the outer ends being elastic for allowing the vehicle to float with rising water, the forward anchoring strap positioned over the forward portion of the vehicle, the rearward anchoring strap positioned over the rearward portion of the vehicle.

3. The vehicle protection system according to claim 2, wherein:
   the housing and cover are each completely formed from a lightweight, flexible and substantially puncture proof material.

4. An emergency flood protection and anchoring system for a vehicle comprising:
   a vehicle housing having a lower surface and side walls integral thereto, the housing defining lower forward and rearward portions as well as a raised central portion, each of the side walls having an upper peripheral edge with a resilient male zip lock element formed on three of the side walls of the vehicle housing, the housing being completely formed from a lightweight, flexible and substantially puncture proof material;
   a housing cover having an edge integral with one of the side walls of the housing and a peripheral edge with a female zip-lock element formed thereon for engagement with the corresponding male zip lock elements formed on the three side walls of the vehicle housing, a spring biased vent centrally formed within the housing cover, the vent having a first orientation forming a fluid tight seal with the cover and a second orientation wherein air is permitted egress from an interior of the housing, whereby when the vehicle to be protected having a forward portion, a rearward portion and an intermediate portion therebetween is positioned within the vehicle housing, the cover can be secured to the peripheral edge of the housing by way of the male and female zip lock elements; and
   forward and rearward anchoring straps, each of the straps having an intermediate non elastic extent and outer elastic extents for allowing the vehicle to float with rising water, a levered adjustment mechanism secured along the intermediate extent for use in adjusting the length of the anchoring strap, a pair of cork-screw anchors releasably secured to outer ends of each anchoring strap for securing the strap to the ground, the forward anchoring strap positioned over the forward portion of the vehicle, the rearward anchoring strap positioned over the rearward portion of the vehicle.

5. A method of protecting a vehicle from elevated water levels, the method comprising the steps of:
   providing a vehicle housing having a lower surface and non-rigid side walls integral thereto, each of the side walls having an upper peripheral edge with a locking element formed on three of the side walls of the vehicle housing, a housing cover having an edge integral with one of the side walls of the housing and a peripheral edge with a locking element formed thereon for engagement with the corresponding locking element formed on the three side walls of the vehicle housing, a spring biased vent centrally formed within the housing cover;
   gathering the side walls about the lower surface such that the peripheral edges are approximately level with the lower surface;
   driving a vehicle over the gathered side walls and onto the lower surface;
   raising the gathered side walls above the vehicle and securing the locking element of the cover with the locking element of the housing;
   providing forward and rearward anchoring straps, each of the straps having a levered adjustment mechanism secured along an intermediate extent;
   securing one end of the forward and rearward anchoring straps into the ground by way of anchoring screws;
   positioning the forward strap over a forward portion of the vehicle;
   positioning the rearward strap over the rearward portion of the vehicle;
   securing the opposite end of the forward and rearward anchoring straps into the ground by way of anchoring screws; and
   tightening the forward and rearward straps by way of the levered adjustment mechanisms.

* * * * *

UNITED STATES PATENT AND TRADEMARK OFFICE
CERTIFICATE OF CORRECTION

PATENT NO. : 6,273,113 B1
DATED : August 14, 2001
INVENTOR(S) : Walter E. Streyckmans It is certified that error appears in the above-identified patent and that said Letters Patent is hereby corrected as shown below:

Column 2,
Line 47, replace "line 4-4 of Fig." with -- line 4-4 of Fig. 1. --.

Column 5,
Line 38, replace "according to claim 2," with -- according to claim 1, --.

Signed and Sealed this

Eighteenth Day of June, 2002

*Attest:*

JAMES E. ROGAN
*Attesting Officer*   *Director of the United States Patent and Trademark Office*